US011706719B2

(12) United States Patent
Myron et al.

(10) Patent No.: US 11,706,719 B2
(45) Date of Patent: Jul. 18, 2023

(54) DYNAMIC OPERATION PARAMETER OPTIMIZATION AND MODULATION OF A WIRELESS NETWORK

(71) Applicant: T-Mobile USA, Inc., Bellevue, WA (US)

(72) Inventors: Peter Myron, Fall City, WA (US); Michael Mitchell, North Bend, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 334 days.

(21) Appl. No.: 17/169,853

(22) Filed: Feb. 8, 2021

(65) Prior Publication Data
US 2022/0256474 A1 Aug. 11, 2022

(51) Int. Cl.
*H04W 52/22* (2009.01)
*H04W 52/34* (2009.01)

(52) U.S. Cl.
CPC ....... *H04W 52/223* (2013.01); *H04W 52/343* (2013.01)

(58) Field of Classification Search
CPC ............ H04W 52/223; H04W 52/343; H04W 52/143
USPC ......................................................... 455/522
See application file for complete search history.

(56) References Cited

U.S. PATENT DOCUMENTS

2012/0170468 A1* 7/2012 La Macchia ...... H04W 52/0216
370/252

\* cited by examiner

*Primary Examiner* — Shaima Q Aminzay
(74) *Attorney, Agent, or Firm* — Han Santos, PLLC

(57) ABSTRACT

Modulating and optimizing operation parameters such as power usage of wireless networks include determining a baseline reference level for a network demand at a base station in a network during a first time interval. The transmission power of the base station corresponding to the baseline reference level is determined, and the network demand at the base station in the network is forecasted during a second time interval. A difference between the projected network demand and the baseline reference level at the second time is determined. The transmission power of the base station is adjusted by a predetermined increment during the second time interval based at least on the difference.

20 Claims, 4 Drawing Sheets

DYNAMIC OPERATION PARAMETER OPTIMIZATION AND MODULATION OF A WIRELESS NETWORK

BACKGROUND

To accommodate the ever-increasing demand for wireless services, large scale wireless telecommunication networks often include a large number of base stations, which are used to service mobile devices in various locations. Typically, these base stations are adjusted to have substantially similar configurations using a network applied optimization that configures each base station using substantially similar parameters. For example, base stations may need to maintain relatively high resource usage even in times of low demand to be responsive to sudden increases in demand. Because wireless service demand varies at different geographical locations, this can result in limited opportunities to decrease resource usage by lowering transmission power levels. Accordingly, such a holistic approach for the entire network to maintain relatively high resource usage may result in individual base stations operating under non-optimal conditions.

BRIEF DESCRIPTION OF THE DRAWINGS

The detailed description is described with reference to the accompanying figures, in which the leftmost digit(s) of a reference number identifies the figure in which the reference number first appears. The use of the same reference numbers in different figures indicates similar or identical items.

DETAILED DESCRIPTION

Figure 1:
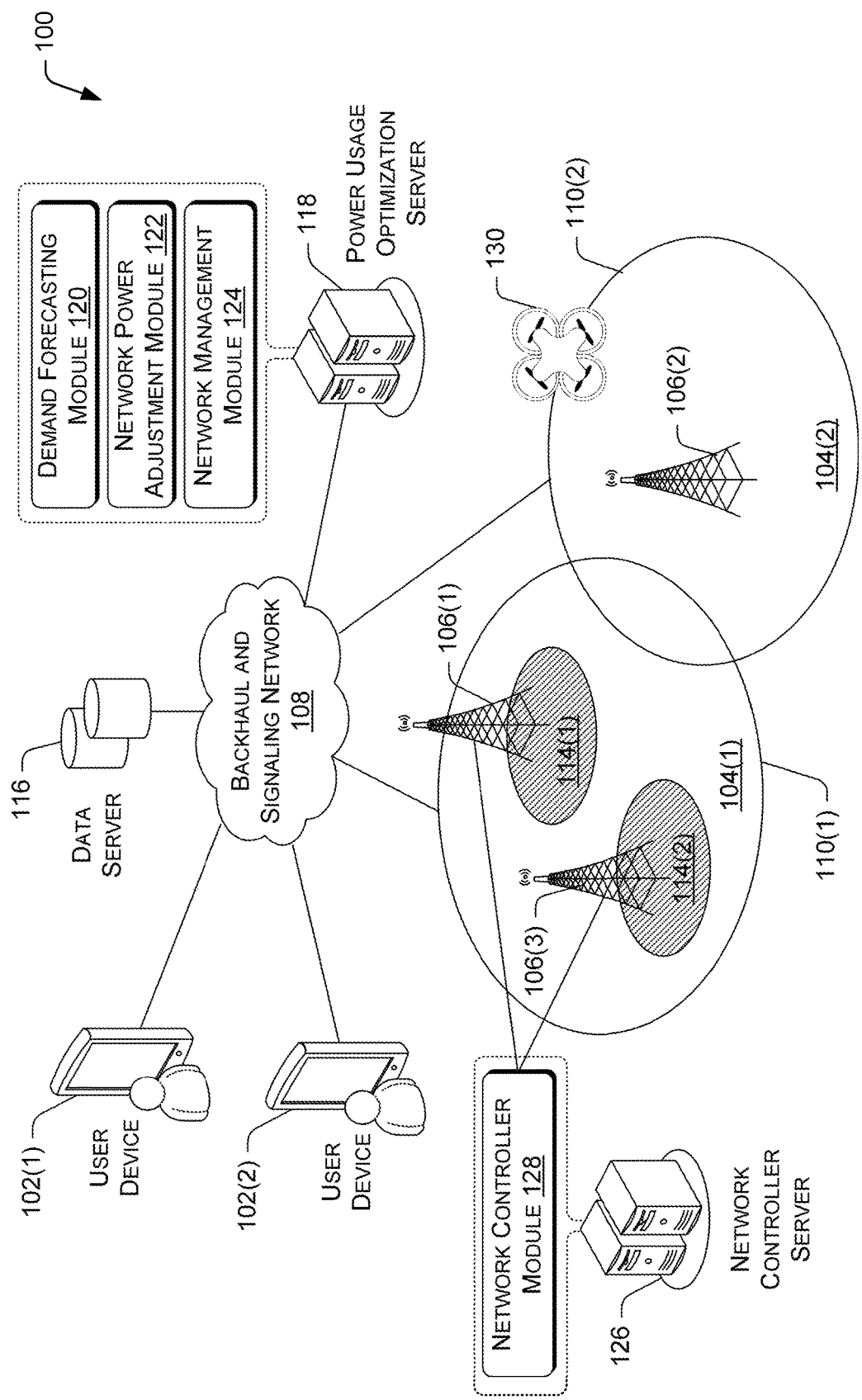
FIG. 1 illustrates an example of a network architecture for providing power modulation and optimization of a base station in a network based at least on demand forecasting for the network.

The techniques and systems described herein are directed, in part, to modulate and optimize operation parameters such as power usage of wireless networks by forecasting network demands. In one aspect, the techniques include optimizing transmission power of the individual access points such as base stations within the networks. While one embodiment of this disclosure is directed to providing power modulation and optimization for base stations, it is contemplated that elements disclosed in one embodiment may be beneficially utilized on other embodiments without specific recitation. For example, operation parameter modulation and optimization may be provided for any radio access points/networks, sites, and/or other network end points or intermediary points that can directly or indirectly exchange communications with user devices such as mobile telecommunication devices, computing devices, or other electronic devices. Similarly, other operation parameter modulation and optimization may be applied to allocate spectrum and prioritizing certain user devices to minimize impact on Quality of Service (QoS). By modulating and optimizing transmission power at each base station in individual networks, the wireless network provider can decrease resource usage by lowering transmission power levels. In some aspects, base stations that are exhibiting similar projected network demand may be grouped and the transmission power can be optimized together.

In some aspects, a power usage optimization server may be configured to monitor and optimize operation parameters for networks in various geographical areas. The power usage optimization server may communicate with a network control server, which may include a network controller that is communicatively coupled to a base station that serves a geographical area in a network. Additionally, or alternatively, the power usage optimization server may communicate directly with one or more access points such as base stations in the network. In some aspects, the power usage optimization server may be configured to manage monitoring and communicating with multiple networks concurrently. For instance, the power usage optimization server may communicate with a primary network and a secondary network that may be maintained in the same or nearby geographical area as the primary network.

In some aspects, the power usage optimization server may determine a baseline performance of one or more base stations in a network and monitor key performance indicators (KPIs) for a network such as data transmission rates, failed requests, bandwidth utilization, available bandwidth, network capacity (measured in upstream and/or downstream bits per second), usage information, physical environmental conditions, and/or other network data or conditions or parameters that can be used to forecast network demand. The power optimization server may take resource management actions by optimizing operation parameters such as reducing or increasing transmission power for a base station in the network based at least on the projected network demand. The power usage optimization server may modulate or adjust parameters for transmission power for each base station in different ways. Additionally, modulations and optimizations of base stations may be based at least on geographic locations (e.g., base stations located in a city, a rural area, etc.). Similarly situated base stations with comparable KPI values and projected network demand may also be grouped.

In some aspects, the power usage optimization server may monitor KPIs to identify performance issues (e.g., congestion, capacity issues, etc.) where a base station serving in a geographical area of a network may be unable to satisfy the projected network demand. In response, the power usage optimization server may manage pre-deployment, preemptive deployment, and post-deployment of one or more mobile access points to the geographical area. The base station and the mobile access point may be configured to jointly operate within the same geographical area in the network until the performance of the network improves.

Additionally, the power usage optimization server may monitor network performance following the implementation of the optimization for transmission power. In one example, the power usage optimization server may determine whether the actual network demand exceeds the projected network demand in a geographical area. If the actual network demand exceeds the projected network demand, the power usage optimization server may monitor KPIs to identify a performance issue in the geographical area within a network comprising a base station. In response to identifying a performance issue, the power usage optimization server may generate instructions to increase the transmission power of the base station to increase service quality. Conversely, the power usage optimization server may determine whether the projected network demand exceeds the actual network demand in the geographical area. If the projected network demand exceeds the actual network demand, the power usage optimization server may generate instructions to reduce the transmission power of the base station.

Accordingly, the techniques described herein benefit the overall function of the mobile network operator's network. For example, the benefits can include lower power consumption, lower equipment demand, and therefore less capital outlay for equipment, and lower operating costs. The techniques described herein may be implemented in a number of ways. Example implementations are provided below with reference to the following figures.

Example Network Architecture

FIG. 1 illustrates an example of a network architecture 100 for providing power modulation of a base station operating in a network based on demand forecasting. FIG. 1 includes one or more user devices 102(1) and 102(2) such as mobile telecommunication devices, computing devices, or other devices that have wireless connectivity that is connected to a telecommunication network. The telecommunication network may include a plurality of hardware, software, and other infrastructure components that may be typical of a large wireless telecommunications provider. In FIG. 1, the user devices 102(1) and 102(2) may be in communication with the telecommunication networks 104(1) and 104(2) utilizing one or more wireless base stations 106(1)-106(3), respectively or any other common wireless or wireline network access technologies. The network 104(1) may be a primary network and the network 104(2) may be a secondary network 104(2). The base stations 106(1)-106(3) described below may permit access to a backhaul and signaling network 108 using a variety of combinations of radio access technologies (RATs).

The base stations 106(1)-106(3) are associated with radio access networks (RANs) (not pictured) used for mobile communications. The RANs may be in communication with a core network directly or through one or more intermediaries, depending on the size and complexity of the telecommunication network. The RANs include a plurality of access points that serve user devices 102(1) and 102(2) over air interfaces. The RANs may be configured to connect to a core network that can perform a variety of functions, including bridging circuit switched (CS) calls between user devices served by a RAN, and can also mediate an exchange of packet-switched (PS) data with external networks such as the Internet.

The base stations 106(1)-106(3) may be located across different geographic areas 110(1) and 110(2) within their respective networks 104(1) and 104(2) to facilitate providing network access and connectivity to users in their corresponding geographic area. In some examples, a base station may partially cover a particular zone within a geographical area. For example, the coverage area for the base station 106(1) may be limited to a first coverage zone 114(1) and the base station 106(3) may serve a second coverage zone 114(2) within the geographical area 110(1). In accordance with one or more embodiments, other types of networks, RANs, and/or components (hardware and/or software) may be employed that enable the user devices 102(1) and 102(2) to communicate with the core network to facilitate activities such as voice calling, messaging, emailing, accessing the Internet, or other types of data communications.

In accordance with one or more embodiments, the telecommunication network may conform to the Universal Mobile Telecommunications System (UMTS) technologies that employ UMTS Terrestrial Radio Access Network (UTRAN). In some instances, the UTRAN may share several components like a Circuit Switch (CS) and a Packet Switch (PS) core network with a Global System for Mobile Communications (GSM) Enhanced Data rates for GSM Evolution (EDGE) Radio Access Network (GERAN). In various instances, a 4G Long Term Evolution (4G/LTE) network that comprises Evolved UMTS Terrestrial Radio Access Network (E-UTRAN) may be employed to transmit data for the telecommunications networks, besides UMTS or GSM. Further, the telecommunication network may implement a 5G next generation (NG) radio system that employs NG Radio Access Network (NG-RAN) and may integrate 4G systems and infrastructure. Thus, UTRAN, GERAN, E-UTRAN, and NG-RAN networks (and other possible RANs) may coexist to process telecommunications traffic.

In some instances, communications may be handed off between UTRAN, GERAN, E-UTRAN, and NG-RAN networks (or other networks) and still maintain communication with a common core network, such as when a user device leaves a range of access (zone) of E-UTRAN and enters a range of access of a UTRAN, GERAN, or NG-RAN. Handoffs may also occur between different types of hardware (e.g., different manufacturers, versions, etc.) for the same network type (e.g., UTRAN, GERAN, E-UTRAN, NG-RAN, etc.). Additionally, the telecommunication network may be, at least in part, a Wi-Fi based network, a Bluetooth network, or other types of wireless network. Accordingly, the base stations 106(1)-106(3) may support various air interfaces, and the base stations 106(1)-106(3) may be a 2G base station, 3G NodeB, 4G/LTE eNodeB, 5G gNodeB, or a Wi-Fi access point, etc. In some aspects, the base stations may also comprise virtual base stations and multi-RAT base stations.

The base stations 106(1)-106(3) may be communicatively coupled to a data server 116 that is configured to store information related to the performance of each base station 106(1)-106(3). Such information can include, for each base station 106(1)-106(3), baseline information of KPIs, historical information regarding the KPIs, statistical aggregation or trend information of the KPIs, and/or other information related to hardware, services, or other related data that is associated with the base stations 106(1)-106(3). The data server 116 may store the aforementioned information in separate tables or locations that may be controlled or managed by other entities. Additionally, the data server 116 may provide some of the aforementioned information or additional performance information to a power usage optimization server 118.

The power usage optimization server 118 may include general-purpose computers, such as desktop computers, tablet computers, laptop computers, servers (e.g., on-premise servers), or other electronic devices that are capable of receiving input, processing the input, and generating output data. The power usage optimization server 118 can include a plurality of physical machines that may be grouped and presented as a single computing system. Each physical machine of the plurality of physical machines may comprise a node in a cluster. The power usage optimization server 118 may also be in the form of virtual machines, such as virtual engines (VE) and virtual private servers (VPS). The power usage optimization server 118 may be operated by a telecommunications service provider or a third-party entity that is working with the telecommunications service provider.

The power usage optimization server 118 may include various modules to perform the functions to provide power modulation and optimization of an access point in a network based at least on demand forecasting for the network. In FIG. 1, the power usage optimization server 118 includes a demand forecasting module 120, a network power adjustment module 122, and a network management module 124. The demand forecasting module 120 forecasts network demand for a specified time period (e.g., weekday morning, weekday afternoon, evenings, weekends, holidays, etc.) based at least on the KPIs. In some aspects, the demand forecasting module 120 may perform basic operations on the obtained data (i.e., KPIs) to calculate an average, a mean, a maximum value, a minimum value, and/or perform other calculations using the obtained data to determine a baseline reference level for network demand at individual base stations.

The demand forecasting module 120 may also implement a data acquisition component to retrieve baseline reference level from various servers, such as the data server 116, from the individual base stations 106(1)-106(3) either in the primary network 104(1) or the secondary network 104(2) either directly or through servers such as the data server 116, or from other hardware and devices (e.g., user devices 102(1) and 102(2)) in a network. In some aspects, the demand forecasting module 120 may communicate with external services such as weather forecasting services, space weather monitoring services, event ticketing systems, crowd tracking services, Global Positioning System (GPS) and navigation services, and/or other services to obtain environmental data and other conditions that may impact network demand.

In some aspects, the network power adjustment module 122 may be configured to monitor and optimize operation parameters for networks in various geographical areas. In one example, the network power adjustment module 122 generates instructions to increase or decrease the transmission power of the base station based at least on the projected network demand. Similarly situated base stations with comparable KPI values and projected network demand may also be grouped for monitoring and optimization. If the projected network demand is greater than the baseline reference level, the network power adjustment module 122 generates instructions to increase the transmission power of the base station at a predetermined time period. Conversely, if the projected network demand is less than the baseline reference level, the network power adjustment module 122 generates instructions to decrease the transmission power of the base station at a predetermined time period.

The network power adjustment module 122 may also communicate with a network control server 126, which may include a network controller 128 that is communicatively coupled to the base stations 106(1)-106(3). The network controller 128 can facilitate communications between the power usage optimization server 118 and the base stations 106(1)-106(3). For example, the network controller 118 may receive reconfiguration parameters for transmission powers from the network power adjustment module 122 and instruct the base stations 106(1)-106(3) to reconfigure the parameters for transmission power. Additionally, or alternatively, the network power adjustment module 122 may communicate directly with the base stations 106(1)-106(3) or other access points in the network to reconfigure the parameters for transmission power.

In some aspects, the network management module 124 may monitor KPIs for the base stations 106(1)-106(3) to identify performance issues (e.g., congestion, capacity issues, etc.) where a base station serving in a geographical area of a network may be unable to satisfy the projected network demand. In response, the network management module 124 may take additional resource management actions by providing dynamic adaptation responses. For example, the network management module 124 may manage pre-deployment, preemptive deployment, and post-deployment of one or more mobile access points to the geographical area. A mobile access point may be an unmanned aerial vehicle (UAV) 130 (e.g., a drone), depending upon embodiments.

Accordingly, the network management module 124 may communicate with the UAV 130 or other mobile access points and/or a control station from which the UAV 130 or other mobile access points are dispatched. In this way, the network management module 124 may strategically dispatch the mobile access points on a scheduled basis or in response to one or more network events or trigger events (e.g., detected network congestion, high demand, etc.) to a location that would best serve the network and improve the network conditions and performance. In some aspects, the location may be predetermined such that the mobile access points may be pre-programmed to travel to a predetermined location. For instance, the predetermined location may be within a specified zone in a geographical area. In other examples, the location may be determined in real-time or near real-time after the mobile access network is dispatched to a specified zone or a geographical area. The mobile access point may determine, upon arriving at a specified zone or a geographical area, a location to best serve the network depending on the network conditions and performance. In FIG. 1, the network management module 124 may configure the base station 106(2) and the UAV 130 may be configured to jointly operate within the same geographical area 110(2) in the network 104(2) until the performance of the network 104(2) improves.

Additionally, the network management module 124 may determine whether the actual network demand exceeds the projected network demand for a base station in a geographical area. If the actual network demand exceeds the projected network demand, the network management module 124 may monitor KPIs for a base station to identify a performance issue in the geographical area within a network comprising the base station. In response to identifying a performance issue, the network management module 124 may trigger the network power adjustment module 122 to generate instructions to increase the transmission power of the base station to increase service quality. Conversely, the network management module 124 may determine whether the projected network demand exceeds the actual network demand in the geographical area. If the projected network demand exceeds the actual network demand, the network management module 124 may trigger the network power adjustment module 122 to generate instructions to reduce the transmission power of the base station.

In some aspects, the network management module 124 may be configured to manage monitoring and communicating with multiple networks concurrently. For instance, the network management module 124 may communicate with a primary network 104(1) and a secondary network 104(2) that may be maintained in the same or nearby geographical area as the primary network 104(1). The network management module 124 may determine that the user demand is greater in one wireless network compared to the other wireless network. For example, the network demand may be greater in the primary network 104(1) compared to the network demand at the secondary network 104(2). In response to determining that the user demand is greater in the primary network 104(1), the network management module 124 may take resource management actions by performing transmission power allocation among the base stations in the wireless networks. For example, the network management module 124 may trigger the network power adjustment module 122 to generate instructions to increase power output for a base station in the primary network 104(1) and decrease power output for an additional base station in the secondary network 104(2). In some aspects, the network management module 124 may establish automatic neighbor relationships between the networks to adjust operating parameters of neighboring base stations in one or more networks to reach an optimal overall operating configuration.

Example Computing Device Components

Figure 2:
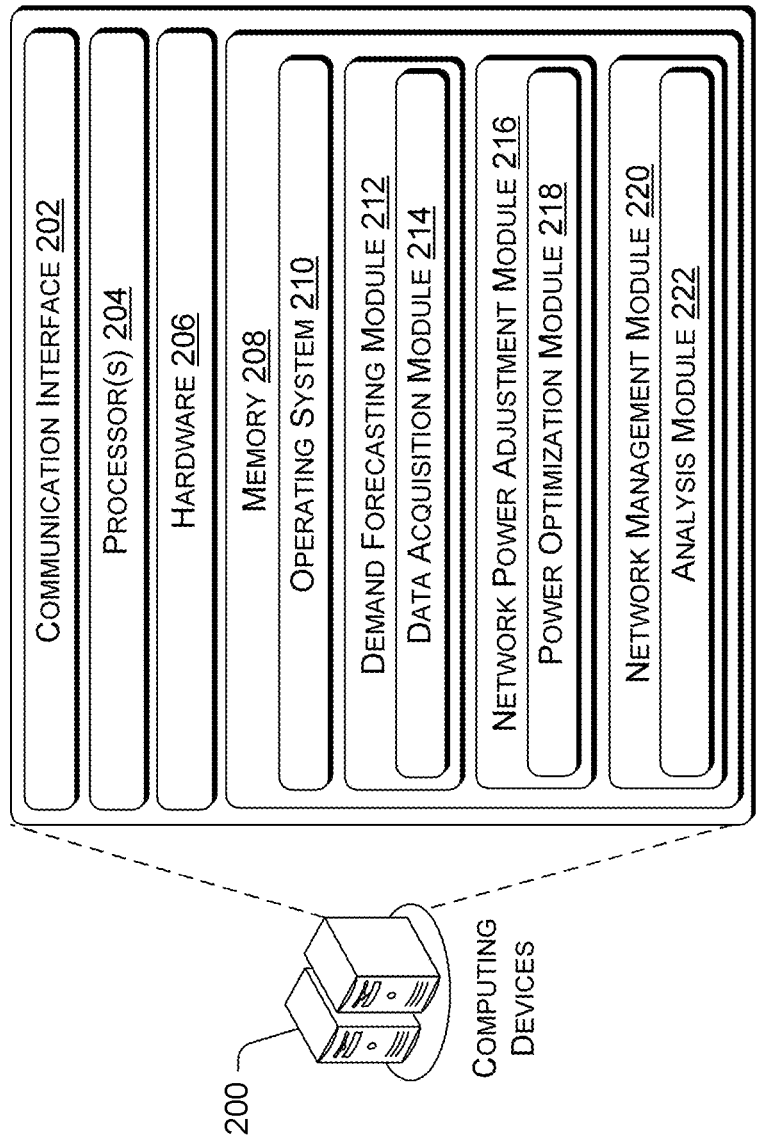
FIG. 2 is a block diagram showing various components of an illustrative computing device that implements power modulation and optimization for base stations in a network.

FIG. 2 is a block diagram showing various components of illustrative computing devices, wherein the computing devices may comprise the power usage optimization server 118 or other network components such as the base stations 106(1)-106(3) or network control server 126 of FIG. 1. It is noted that the computing devices 200 as described herein can operate with more or fewer of the components shown herein. Additionally, the computing devices 200 as shown herein or portions thereof can serve as a representation of one or more of the computing devices of the present system.

The computing devices 200 may include a communication interface 202, one or more processors 204, hardware 206, and memory 208. The communication interface 202 may include wireless and/or wired communication components that enable the computing devices 200 to transmit data to and receive data from other networked devices (e.g., antennas, transceivers, etc.). In at least one example, the one or more processor(s) 204 may be a central processing unit(s) (CPU), graphics processing unit(s) (GPU), both a CPU and GPU or any other sort of processing unit(s). Each of the one or more processor(s) 204 may have numerous arithmetic logic units (ALUs) that perform arithmetic and logical operations as well as one or more control units (CUs) that extract instructions and stored content from processor cache memory, and then execute these instructions by calling on the ALUs, as necessary during program execution.

The one or more processor(s) 204 may also be responsible for executing all computer applications stored in the memory, which can be associated with common types of volatile (RAM) and/or nonvolatile (ROM) memory. The hardware 206 may include additional user interface, data communication, or data storage hardware. For example, the user interfaces may include a data output device (e.g., visual display, audio speakers), and one or more data input devices. The data input devices may include but are not limited to, combinations of one or more keypads, keyboards, mouse devices, touch screens that accept gestures, microphones, voice or speech recognition devices, environmental sensors, and any other suitable devices.

The memory 208 may be implemented using computer-readable media, such as computer storage media. Computer-readable media includes, at least, two types of computer-readable media, namely computer storage media and communications media. Computer storage media includes volatile and nonvolatile, removable and non-removable media implemented in any method or technology for storage of information such as computer-readable instructions, data structures, program modules, or other data. Computer storage media includes, but is not limited to, RAM, ROM, EEPROM, flash memory or other memory technology, CD-ROM, digital versatile disks (DVD), high-definition multimedia/data storage disks, or other optical storage, magnetic cassettes, magnetic tape, magnetic disk storage or other magnetic storage devices, or any other non-transmission medium that can be used to store information for access by a computing device. In contrast, communication media may embody computer-readable instructions, data structures, program modules, or other data in a modulated data signal, such as a carrier wave, or other transmission mechanisms. The memory 208 may also include a firewall. In some embodiments, the firewall may be implemented as hardware 206 in the computing devices 200.

The processor(s) 204 and the memory 208 of the computing devices 200 may implement an operating system 210, a demand forecasting module 212, a network power adjustment module 216, and a network management module 220. The demand forecasting module 212, the network power adjustment module 216, and the network management module 220 correspond to the demand forecasting module 120, the network power adjustment module 216, and the network management module 124 of FIG. 1, respectively.

The operating system 210 may include components that enable the computing devices 200 to receive and transmit data via various interfaces (e.g., user controls, communication interface, and/or memory input/output devices), as well as process data using the processor(s) 204 to generate output. The operating system 210 may include a presentation component that presents the output (e.g., display the data on an electronic display, store the data in memory, transmit the data to another electronic device, etc.). Additionally, the operating system 210 may include other components that perform various additional functions generally associated with an operating system.

The demand forecasting module 212, the network power adjustment module 216, and the network management module 220 may include routines, program instructions, objects, and/or data structures that perform particular tasks or implement particular abstract data types. For example, the demand forecasting module 212 may include one or more instructions, which when executed by the one or more processors 204 direct the computing devices 200 to perform operations related to forecasting network demand at a base station in a network based at least on KPI values (e.g., data transmission rates, failed requests, bandwidth utilization, available bandwidth, network capacity (measured in upstream and/or downstream bits per second), usage information, etc.).

The demand forecasting module 212 may include a data acquisition module 214 to retrieve the KPI values and other network data from various sources. For example, the data acquisition module 214 may link tables maintained and updated by various servers, such as the data server 116 of FIG. 1. The data acquisition module 214 may compile the KPI values and other network data over a predetermined period of time. Accordingly, the demand forecasting module 212 may forecast network demand for a specified time period (e.g., weekday morning, weekday afternoon, evenings, weekends, holidays, etc.) using KPI values and other network data collected during a corresponding period of time. The data acquisition module 214 may perform basic operations on the obtained data, such as calculate an average, a mean, a maximum value, a minimum value, and/or perform other calculations using the obtained data to determine a baseline reference level for network demand at individual base stations. The data acquisition module 214 may also retrieve baseline reference level or information from various servers and/or devices (e.g., user devices) and other network data or attributes from various servers and/or devices (e.g., user devices), such as the data server, user devices, or from individual base stations, either directly or through servers such as the data server.

Upon retrieving the KPI values and other network data from various sources, the demand forecasting module 212 may detect a trend and predict where network demand at a base station in a network is likely above or below a baseline reference level for the user demand. In some aspects, the demand forecasting module 212 is configured to generate a prediction model for network demand at individual base stations in a network. For example, the demand forecasting module 212 may generate a prediction model for a base station for each day of the week and at different time intervals during the day. Based at least on the prediction model, the demand forecasting module 212 may determine whether the network demand is high or low during a time interval. Additionally, the demand forecasting module 212 may identify base stations that are exhibiting similar prediction models and group those base stations together in a cluster to predict network demand for a cluster of base stations. Similarly, the demand forecasting module 212 can undo a cluster or remove a base station from a cluster if it deems that the base station no longer belongs to a cluster.

The network power adjustment module 216 may include one or more instructions, which when executed by the one or more processors 204 direct the computing devices 200 to perform operations related to resource management actions by managing transmission power optimizations for each base station based at least on the projected network demand. In one aspect, the network power adjustment module 216 may be configured to compare the projected network demand of a base station to the respective baseline reference level to determine whether the projected network demand exceeds the baseline reference level. If the projected network demand exceeds the baseline reference level, the network power adjustment module 216 may instruct the base station to increase its transmission power levels. Conversely, if the projected network demand does not exceed the baseline reference level, the network power adjustment module 216 may instruct the base station to decrease its transmission power levels.

The network power adjustment module 216 may include a power optimization module 218 to optimize the transmission power levels for base stations based on projected network demand. In one aspect, the power optimization module 218 may optimize the power levels for each base station individually. More specifically, the power optimization module 218 may modulate one or more antennas on the individual base stations. Additionally, or alternatively, the power optimization module 218 may optimize the power levels of clusters of base stations. The power optimization module 218 may optimize each base station and/or cluster of base stations in different ways. For example, a first base station may receive a first adjustment while a second base station may receive a second adjustment that is different than the first adjustment. In another example, a first base station in the first cluster may receive a first adjustment while a second range of base stations in the first cluster may receive a second adjustment that is different than the first adjustment. In some embodiments, the power optimization module 218 may make a different adjustment based on the values of the parameters for the transmission power, projected network demand, KPIs of a base station, and/or so forth.

The network management module 220 may include one or more instructions which, when executed by the one or more processors 204, direct the computing devices 200 to perform operations related to tracking network performance and managing communication with one or more base stations in one or more networks. The network management module 220 may include an analysis module 222 to analyze the performance of the base stations and/or the various components of a network following the implementation of the optimization for transmission power. In one aspect, the analysis module 222 may determine whether the actual network demand exceeds the projected network demand for a base station by a predetermined threshold value. If the actual network demand exceeds the projected network demand by the predetermined threshold value, the analysis module 222 may determine whether the base station exhibits performance issues or is unable to satisfy network demand. In one example, the analysis module 222 may initiate retrieval of KPIs and related data from a data server via the data acquisition module 214. For example, the analysis module 222 may refer to historic data of one or more base stations to determine a baseline performance of one or more KPIs for the one or more base stations. To that end, the analysis module 222 triggers the data acquisition module 214 to interact with the data server to retrieve stored historical data regarding the relevant one or more base stations.

Upon obtaining KPIs, the analysis module 222 may compare KPI values to predetermined congestion thresholds to determine whether a base station can satisfy network demand. Upon determining that a base station is unable to satisfy network demand, the analysis module 222 may trigger the network power adjustment module 216 to instruct the base station to increase its transmission power levels. Similarly, if the projected network demand exceeds the actual network demand by an additional predetermined threshold value, the analysis module 222 may instruct the base station to decrease its transmission power levels. In various embodiments, additional operation parameters of a base station may be modulated and optimized to satisfy network demand. For example, similar techniques may be applied to perform spectrum management to support spectrum allocation. Spectrum management may also include spectrum aggregation, which may be provided to increase the bandwidth. Conversely, spectrum segregation may be provided to limit interference based at least on the number of user devices in a given geographical area. Further, network traffic may be prioritized to serve various types of user devices while minimizing impact on QoS. For instance, lower priority traffic may be slowed down to provide better throughput for higher priority traffic. In this regard, certain types of devices may be set as a priority device.

In some aspects, the analysis module 222 may provide feedback to the demand forecasting module 212 indicating the difference between the projected network demand and the actual network demand to continuously refine the prediction model for network demand at individual base stations in a network. If a base station is unable to satisfy network demand (i.e., following the implementation of power modulation), the network management module 220 may also dispatch a mobile access point (e.g., supplemental base station) to the geographical area in need of supplemental service. In this way, the network management module 220 may manage pre-deployment, preemptive deployment, and post-deployment of one or more mobile access points to the geographical area. The geographical area may be strategically selected in order to deploy the mobile access point in a dynamic manner. The base station in the geographical area and the mobile access point may be configured to jointly operate within the same geographical area in the network until the performance of the network improves. The network management module 220 may dispatch the mobile access point in response to one or more network events (e.g., detected network congestion) or on a scheduled basis, depending upon embodiments. In the latter scenario, the demand forecasting module 212 may detect a trend and identify the time and/or location where congestion or capacity issues in the network are likely to occur, and then provide this information to the network management module 220 for management of mobile access points.

Example Processes

Figure 3:
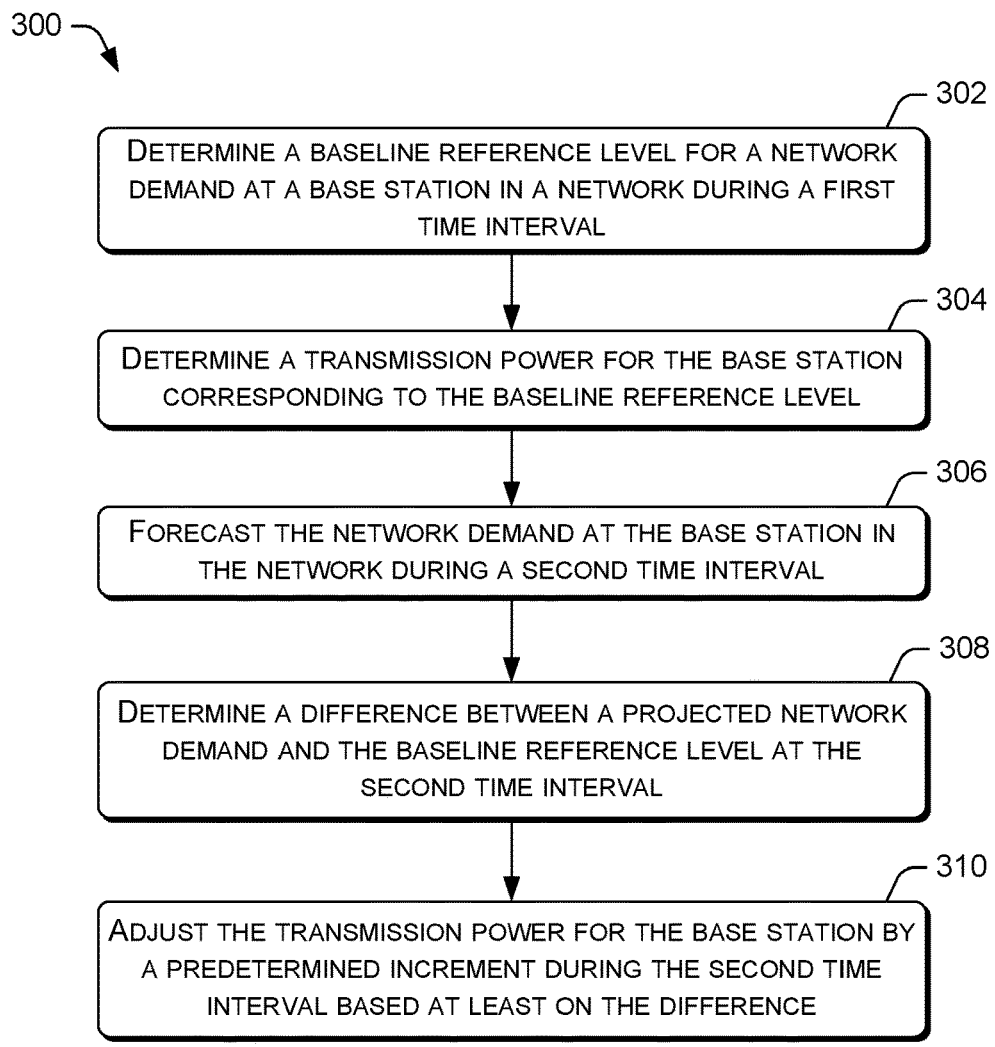
FIG. 3 is a flow diagram of an example process for optimizing operating parameters such as power transmission for a base station in a network based at least on demand forecasting for the network.
Figure 4:
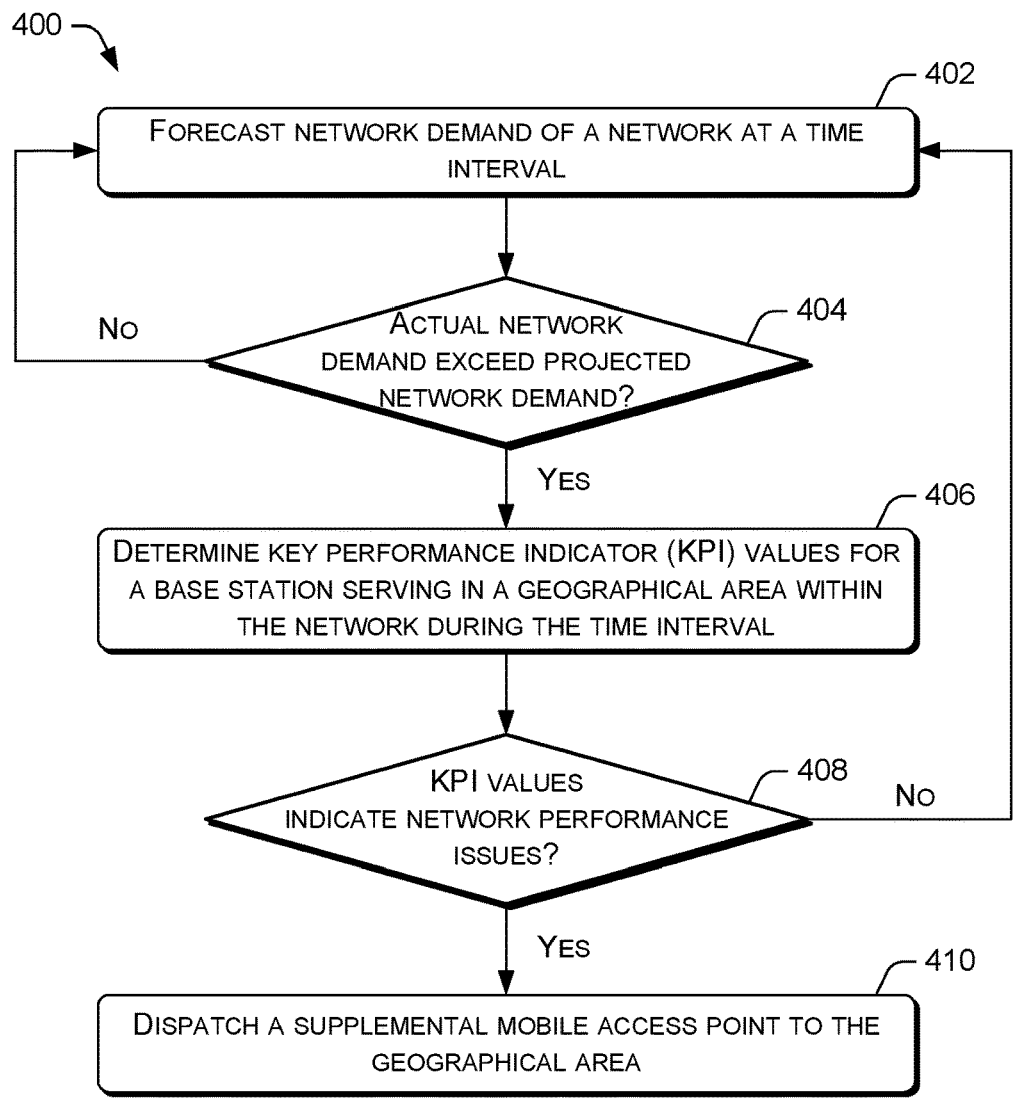
FIG. 4 is a flow diagram of an example process for providing dynamic demand adaptation based on demand forecasting and network performance.

FIGS. 3 and 4 present illustrative processes 300-400 for optimizing transmission power. The processes 300-400 are illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, programs, objects, components, data structures, and the like that perform particular functions or implement particular abstract data types. The order in which the operations are described is not intended to be construed as a limitation, and any number of the described blocks can be combined in any order and/or in parallel to implement the process. For discussion purposes, the processes 300-400 are described with reference to the network architecture 100 of FIG. 1 and the computing devices 200 of FIG. 2.

FIG. 3 is a flow diagram of an example process 300 for optimizing power usage for primary networks based on demand forecasting. The process 300 may be performed by the power usage optimization server as described above. At block 302, the data acquisition module of the power usage optimization server may determine a baseline reference level for a network demand at a base station in a network during a first time interval. The data acquisition module may perform basic operations on KPI values associated with the base station to determine a baseline reference level or retrieve baseline reference level from various servers (e.g., a data server, individual base stations, etc.).

At block 304, the demand forecasting module of the power usage optimization server may determine a transmission power of the base station corresponding to the baseline reference level. The transmission power may also be obtained from the data server or the base station. At block 306, the demand forecasting module may forecast the network demand at the base station in the network during a second time interval. In some aspects, the demand forecasting module is configured to generate a prediction model for network demand at individual base stations in a network. Based at least on the prediction model, the demand forecasting module may determine whether the network demand is high or low during a time interval. Additionally, the demand forecasting module may identify base stations that are exhibiting similar prediction models and group those base stations in a cluster to predict network demand for a cluster of base stations.

At block 308, the network power adjustment module of the power usage optimization server may determine a difference between a projected network demand and the baseline reference level at the second time interval. At block 310, the power optimization module of the power usage optimization server may adjust the transmission power of the base station by a predetermined increment (e.g., decibels, Watts, etc.) during the second time interval based at least on the difference. In some aspects, the network power adjustment module may generate instructions to increase or decrease the transmission power of the base station based at least on the projected network demand. For instance, if the projected network demand is greater than the baseline reference level, the network power adjustment module generates instructions to increase the transmission power of the base station. Conversely, if the projected network demand is less than the baseline reference level, the network power adjustment module generates instructions to decrease the transmission power of the base station.

FIG. 4 is a flow diagram of an example process for providing dynamic demand adaptation based on demand forecasting. The process 400 may be performed by the power usage optimization server as described above. At block 402, the demand forecasting module of the power usage optimization server may forecast a network demand at a base station in a network during a time interval. The demand forecasting module may implement a prediction model generated using KPI values for the base station to determine the projected network demand. At decision block 404, the network management module of the power usage optimization server may determine whether an actual network demand exceeds the projected network demand. The network management module may determine the actual network demand based at least on the KPI values, which may be obtained via the data acquisition module that may be configured to compile the KPI values and other network data over a predetermined period of time. If the actual network demand exceeds the projected network demand ("yes" from block 404), the analysis module of the power usage optimization server may analyze the obtained KPI values for the base station serving in a geographical area within the network during the time interval as indicated in block 406. The analysis module may analyze the performance of the base station following the implementation of the adjustment of the transmission power of the base station. In this regard, the analysis module may implement a feedback loop or a similar mechanism for providing feedback to the demand forecasting module and to indicate the difference between the projected network demand and the actual network demand to continuously refine the prediction model for network demand at the base station in the network. If the actual network demand does not exceed the projected network demand ("no" from block 404), the analysis module may continuously monitor the actual network demand.

At decision block 408, the analysis module determines whether the KPI values indicate network performance issues. If the KPI values indicate network performance issues ("yes" from block 408), the network management module dispatches a mobile access point to the geographical area as indicated in block 410. The network management module may also configure the mobile access point and the base station to jointly operate in the geographical area. The mobile access point may operate in the geographical area until the performance issues are resolved. If the KPI values do not indicate network performance issues ("no" from block 408), the analysis module may continuously monitor the actual network demand and performance indicators of the base station.

CONCLUSION

Although the subject matter has been described in language specific to structural features and/or methodological acts, it is to be understood that the subject matter defined in the appended claims is not necessarily limited to the specific features or acts described. Rather, the specific features and acts are disclosed as exemplary forms of implementing the claims.

What is claimed is:

1. One or more non-transitory computer-readable media storing computer-executable instructions that upon execution cause one or more processors to perform acts comprising:
   determining a baseline reference level for a network demand at a base station in a network during a first time interval;
   determining a transmission power of the base station corresponding to the baseline reference level;
   forecasting the network demand at the base station in the network during a second time interval;
   determining a difference between a projected network demand and the baseline reference level at the second time interval; and
   adjusting the transmission power of the base station by a predetermined increment during the second time interval based at least on the difference.

2. The one or more non-transitory computer-readable media of claim 1, wherein the difference indicates that the projected network demand exceeds the baseline reference level, the acts further comprising:
   increasing the transmission power of the base station by the predetermined increment during the second time interval.

3. The one or more non-transitory computer-readable media of claim 1, wherein the difference indicates that the baseline reference level exceeds the projected network demand, the acts further comprising:
   decreasing the transmission power of the base station by the predetermined increment during the second time interval.

4. The one or more non-transitory computer-readable media of claim 1, wherein the acts further comprise:
   determining an actual network demand at the base station in the network during the second time interval;
   determining whether the actual network demand at the base station exceeds the projected network demand;
   in response to determining that the actual network demand exceeds the projected network demand, determining whether the base station satisfies the actual network demand; and
   in response to determining that the base station does not satisfy the actual network demand, adjusting the transmission power of the base station by an additional predetermined increment during the second time interval.

5. The one or more non-transitory computer-readable media of claim 1, wherein the acts further comprise:
   determining whether the base station satisfies an actual network demand at the second time interval; and
   in response to determining that the base station does not satisfy the actual network demand, dispatching one or more mobile access points to a location for supporting the base station.

6. The one or more non-transitory computer-readable media of claim 1, wherein the acts further comprise:
   determining an additional baseline reference level for an additional network demand at an additional base station in the network during the first time interval;
   determining an additional transmission power of the additional base station corresponding to the additional baseline reference level;
   forecasting the additional network demand at the additional base station in the network during the second time interval;
   determining whether an additional projected network demand and the projected network demand are within a predetermined range; and
   in response to determining that the additional projected network demand and the projected network demand are within the predetermined range, grouping the base station and the additional base station in a cluster.

7. The one or more non-transitory computer-readable media of claim 6, wherein the acts further comprise:
   determining an additional difference between the additional projected network demand and the additional baseline reference level at the second time interval; and
   adjusting the additional transmission power of the additional base station by an additional predetermined increment during the second time interval based at least on the additional difference, wherein the predetermined increment and the additional predetermined increment is different.

8. A computer-implemented method, comprising:
   determining a baseline reference level for a network demand at a base station in a network during a first time interval;
   determining a transmission power of the base station corresponding to the baseline reference level;
   forecasting the network demand at the base station in the network during a second time interval;
   determining a difference between a projected network demand and the baseline reference level at the second time interval; and
   adjusting the transmission power of the base station by a predetermined increment during the second time interval based at least on the difference.

9. The computer-implemented method of claim 8, wherein the difference indicates that the projected network demand exceeds the baseline reference level, the method further comprising:
   increasing the transmission power of the base station by the predetermined increment during the second time interval.

10. The computer-implemented method of claim 8, wherein the difference indicates that the baseline reference level exceeds the projected network demand, the acts further comprising:
    decreasing the transmission power of the base station by the predetermined increment during the second time interval.

11. The computer-implemented method of claim 8, further comprising:
    determining an actual network demand at the base station in the network during the second time interval;
    determining whether the actual network demand at the base station exceeds the projected network demand;
    in response to determining that the actual network demand exceeds the projected network demand, determining whether the base station satisfies the actual network demand; and
    in response to determining that the base station does not satisfy the actual network demand, adjusting the transmission power of the base station by an additional predetermined increment during the second time interval.

12. The computer-implemented method of claim 8, further comprising:
   determining whether the base station satisfies an actual network demand at the second time interval; and
   in response to determining that the base station does not satisfy the actual network demand, dispatching one or more mobile access points to a location for supporting the base station.

13. The computer-implemented method of claim 8, further comprising:
   determining an additional baseline reference level for an additional network demand at an additional base station in the network during the first time interval;
   determining an additional transmission power of the additional base station corresponding to the additional baseline reference level;
   forecasting the additional network demand at the additional base station in the network during the second time interval;
   determining whether an additional projected network demand and the projected network demand are within a predetermined range; and
   in response to determining that the additional projected network demand and the projected network demand are within the predetermined range, grouping the base station and the additional base station in a cluster.

14. The computer-implemented method of claim 13, further comprising:
   determining an additional difference between the additional projected network demand and the additional baseline reference level at the second time interval; and
   adjusting the additional transmission power of the additional base station by an additional predetermined increment during the second time interval based at least on the additional difference, wherein the predetermined increment and the additional predetermined increment is different.

15. A system, comprising:
   one or more non-transitory storage mediums configured to provide stored computer-readable instructions, the one or more non-transitory storage mediums coupled to one or more processors, the one or more processors configured to execute the computer-readable instructions to cause the one or more processors to:
   determine a baseline reference level for a network demand at a base station in a network during a first time interval;
   determine a transmission power of the base station corresponding to the baseline reference level;
   forecast the network demand at the base station in the network during a second time interval;
   determine a difference between a projected network demand and the baseline reference level at the second time interval; and
   adjust the transmission power of the base station by a predetermined increment during the second time interval based at least on the difference.

16. The system of claim 15, wherein the difference indicates that the projected network demand exceeds the baseline reference level, the one or more processors are further configured to:
   increase the transmission power of the base station by the predetermined increment during the second time interval.

17. The system of claim 15, wherein the difference indicates that the baseline reference level exceeds the projected network demand, the one or more processors are further configured to:
   decrease the transmission power of the base station by the predetermined increment during the second time interval.

18. The system of claim 15, wherein the one or more processors are further configured to:
   determine an actual network demand at the base station in the network during the second time interval;
   determine whether the actual network demand at the base station exceeds the projected network demand;
   in response to determining that the actual network demand exceeds the projected network demand, determine whether the base station satisfies the actual network demand; and
   in response to determining that the base station does not satisfy the actual network demand, adjust the transmission power of the base station by an additional predetermined increment during the second time interval.

19. The system of claim 15, wherein the one or more processors are further configured to:
   determine an additional baseline reference level for an additional network demand at an additional base station in the network during the first time interval;
   determine an additional transmission power of the additional base station corresponding to the additional baseline reference level;
   forecast the additional network demand at the additional base station in the network during the second time interval;
   determine whether an additional projected network demand and the projected network demand are within a predetermined range; and
   in response to determining that the additional projected network demand and the projected network demand are within the predetermined range, group the base station and the additional base station in a cluster.

20. The system of claim 19, wherein the one or more processors are further configured to:
   determine an additional difference between the additional projected network demand and the additional baseline reference level at the second time interval; and
   adjust the additional transmission power of the additional base station by an additional predetermined increment during the second time interval based at least on the additional difference, wherein the predetermined increment and the additional predetermined increment is different.

* * * * *